(12) United States Patent
Johannesson et al.

(10) Patent No.: US 9,096,475 B2
(45) Date of Patent: Aug. 4, 2015

(54) GARBAGE TO FERTILIZER CONVERSION SYSTEM

(71) Applicants: Edward J. Johannesson, Pembina, ND (US); Madison A. Phillips, Pembina, ND (US)

(72) Inventors: Edward J. Johannesson, Pembina, ND (US); Madison A. Phillips, Pembina, ND (US)

( * ) Notice: Subject to any disclaimer, the term of this patent is extended or adjusted under 35 U.S.C. 154(b) by 0 days.

(21) Appl. No.: 14/072,040

(22) Filed: Nov. 5, 2013

(65) Prior Publication Data

US 2015/0121978 A1     May 7, 2015

(51) Int. Cl.
   *C05F 11/08*     (2006.01)
   *C05F 9/02*     (2006.01)
   *C05F 9/00*     (2006.01)
   *C05F 17/00*     (2006.01)
   *C05F 9/04*     (2006.01)

(52) U.S. Cl.
   CPC ... *C05F 9/02* (2013.01); *C05F 9/00* (2013.01); *C05F 9/04* (2013.01); *C05F 17/00* (2013.01)

(58) Field of Classification Search
   USPC .......................................................... 71/6–10
   See application file for complete search history.

(56) References Cited

U.S. PATENT DOCUMENTS

| | | | |
|---|---|---|---|
| 1,101,129 A | 6/1914 | Kitchen | |
| 1,633,078 A * | 6/1927 | Engle | 504/102 |
| 3,579,320 A | 5/1971 | Pesses | |
| 3,653,871 A * | 4/1972 | Tempe | 71/8 |
| 3,713,800 A | 1/1973 | Karnemaat | |
| 3,736,111 A * | 5/1973 | Gardner et al. | 48/111 |
| 3,897,215 A * | 7/1975 | Davidson et al. | 422/255 |
| 4,146,381 A * | 3/1979 | Willisch et al. | 71/9 |
| 4,203,755 A | 5/1980 | Ruckstuhl | |
| 4,758,344 A * | 7/1988 | Wildenauer | 210/603 |
| 5,071,075 A | 12/1991 | Wiens | |
| 5,250,100 A | 10/1993 | Armbristor | |
| 5,322,792 A * | 6/1994 | Peguy | 435/290.3 |
| 5,441,552 A * | 8/1995 | DeLillo | 71/9 |
| 5,522,913 A | 6/1996 | Peguy | |
| 5,534,437 A | 7/1996 | Arrau | |
| 6,106,197 A | 8/2000 | Kozak | |
| 6,136,590 A | 10/2000 | Kruse | |
| 6,168,642 B1 * | 1/2001 | Valkanas et al. | 71/9 |
| 6,423,532 B1 * | 7/2002 | Rindelaub | 435/262.5 |
| 7,744,671 B1 * | 6/2010 | Ouellette | 71/9 |

\* cited by examiner

Primary Examiner — Wayne Langel
(74) Attorney, Agent, or Firm — Neustel Law Offices

(57) ABSTRACT

A garbage to fertilizer conversion system for converting garbage to fertilizer. The garbage to fertilizer conversion system generally includes a processing machine that separates the garbage into compostable and non-compostable materials. A magnetic separator removes ferromagnetic materials from the compostable material. An auger assembly moves and discharges the compostable material to form a pile. A heater is located under the pile to heat the pile and form a composted material. A three stage screen separates the composted material into three sizes. A dryer receives the composted material and discharges a dried composted material. A trommel screen separates the dried composted material into a small sized material useable as fertilizer and a medium sized material useable as potting soil.

20 Claims, 8 Drawing Sheets

GARBAGE TO FERTILIZER CONVERSION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to the handling of waste materials such as garbage and more specifically it relates to a garbage to fertilizer conversion system for converting garbage into fertilizer and potting soil.

2. Description of the Related Art

Any discussion of the related art throughout the specification should in no way be considered as an admission that such related art is widely known or forms part of common general knowledge in the field.

The disposal of waste materials such as household garbage and commercial trash is a significant problem facing many municipalities. Current landfills will eventually reach capacity and new landfills are extremely difficult to open due to citizen opposition and permitting issues from state and local regulators. It is important to reduce the volume of waste materials deposited into landfills in order to maximize the life of the landfill. Current processes for the treatment of garbage suffer from several problems. The current treatment processes produce materials that are not readily marketable. The current treatment process produce materials that have a high moisture level and are difficult to store and ship.

Because of the inherent problems with the related art, there is a need for a new and improved garbage to fertilizer conversion system for system for converting garbage into fertilizer.

BRIEF SUMMARY OF THE INVENTION

The invention generally relates to a garbage to fertilizer conversion system which includes a processing building for receiving garbage material. A processing machine is located in the processing building for separating the garbage material into compostable and non-compostable materials. A magnetic separator receives said compostable materials from the processing machine. The magnetic separator separates ferromagnetic materials from the compostable material. An auger assembly receives the compostable material from the magnetic separator and moves and discharges the compostable material to form at least one pile of the compostable material. A heater is located under the pile of composted material for heating the pile of compostable material and forming a composted material. A three stage screen receives the composted material and separates the composted material into three sizes. A dryer receives the composted material and discharges a dried composted material. A trommel screen receives the dried composted material and separates the dried composted material into a small sized fraction and a medium sized fraction dried composted material. A fertilizer building receives the small sized fraction composted material for storage. A packaging building receives the medium sized fraction composted material for packaging.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
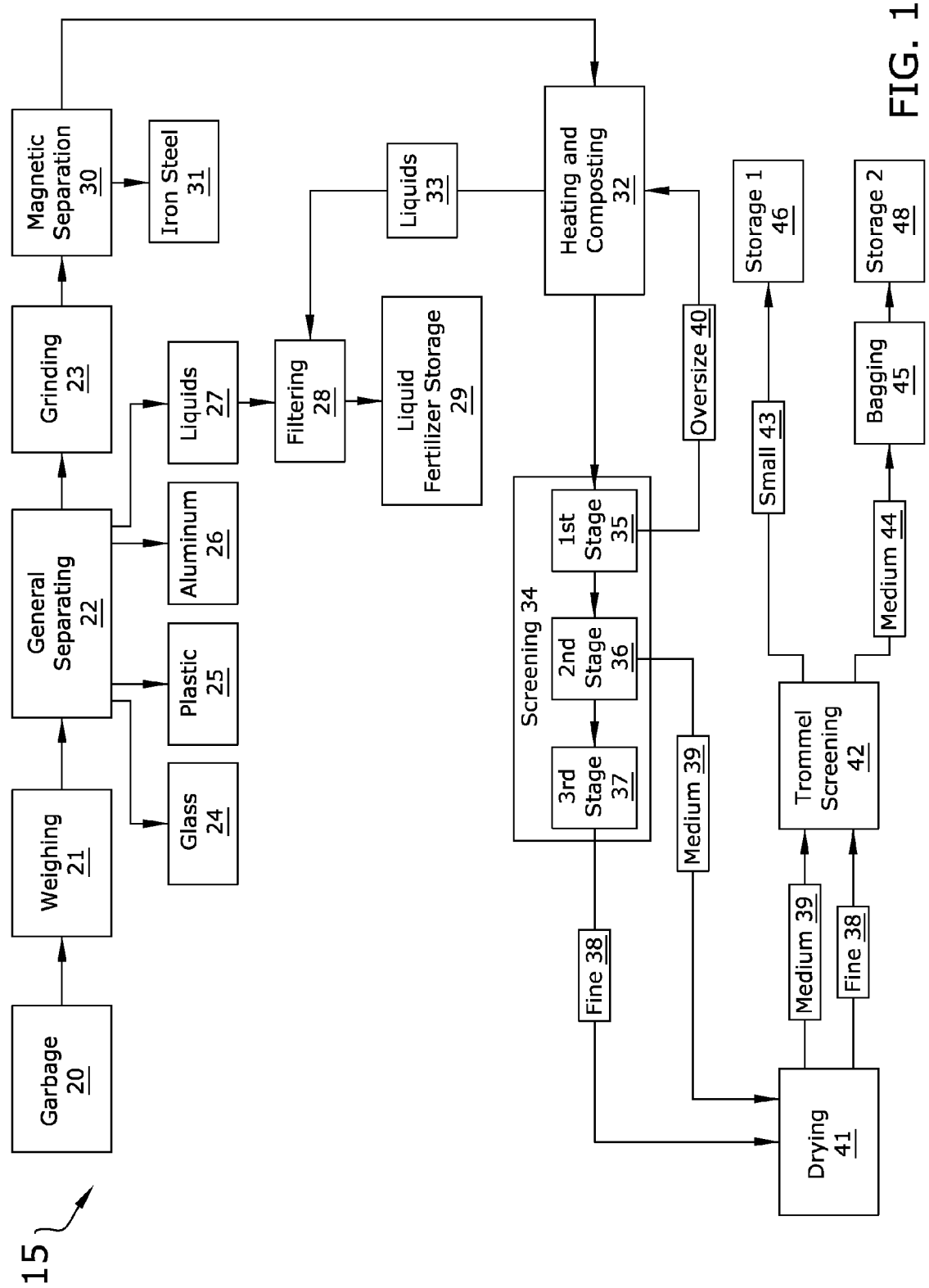
FIG. 1 is a flowchart of a garbage to fertilizer conversion process.

Turning now descriptively to the drawings, in which similar reference characters denote similar elements throughout the several views, FIGS. 1 through 8 illustrate a garbage to fertilizer conversion system 10, which comprises a processing building 64 for receiving garbage material 21. A processing machine 80 is located in the processing building for separating the garbage material into compostable and non-compostable materials. A grinding machine 81 grinds the garbage into smaller sized pieces. A magnetic separator 86 receives the compostable materials 83 from the processing machine. The magnetic separator 86 separates ferromagnetic materials from the compostable material 83. An auger assembly 101 receives the compostable material 83 from the magnetic separator 86 and moves and discharges the compostable material 83 to form at least one pile 108 of the compostable material 83. A heater 107 is located under the pile 108 of compostable material 83 for heating the pile 108 of compostable material 83 and forming a composted material 114. A three stage screen 118 receives the composted material 114 and separates the composted material 114 into three sizes. A dryer 134 receives the composted material 114 and discharges a dried composted material 129. A trommel screen 136 receives the dried composted material 129 and separates the dried composted material 129 into a small sized fraction 43 and a medium sized fraction 44 dried composted material 129. A fertilizer building 142 receives the small sized fraction 43 composted material for storage. A packaging building 145 receives the medium sized fraction 44 composted material for packaging.

B. Garbage to Fertilizer Process

FIG. 1 illustrates a flowchart of a process 15 for converting garbage 20 to fertilizer 43. In coming household garbage or waste 20 is weighed in a weighing operation 21 to determine the weight of the incoming garbage 20. The household garbage 20 contains organic matter such as kitchen waste, paper and yard waste. The household garbage 20 can also contain other materials such as glass 24, plastic 25, aluminum 26 and iron/steel 31. The garbage 20 is placed in a general separating process 22 to segregate out non-compostable materials from the organic materials. The general separating process 22 removes glass 24, plastic 25 and aluminum 26. These materials can be recycled. The garbage is then subjected to grinding 23 in order to reduce the size of the garbage 20 material. The garbage 20 material next undergoes a magnetic separation process 30 using magnets to remove ferromagnetic materials such as iron and steel 31.

The remaining garbage 20 materials are primarily organic materials and are piled for heating and composting 32 over a period of time. Heaters apply heat to the compost piles to maintain the interior of the piles 108 between 170 to 215 degrees Fahrenheit. During the composting process 32, a variety of micro-organisms breakdown the organic materials into compost. After composting, the composted material 114 is sorted for size by screening through a three stage screening operation 34. The three stage screening operation 34 includes a first screening stage 35, a second screening stage 36 and third screening stage 37. The first screening stage 35 removes oversize composted material 40. The oversize composted material 40 is returned to the composting process 32, where the oversize composted material 40 is further broken down. The second screening stage 36 removes medium sized composted material 39. The medium sized composted material 39 is sent to a dryer 134 to undergo a drying operation 41. The third screening stage 37 removes finely sized composted material 38. The finely sized composted material 38 is also sent to a dryer 134 to undergo a drying operation 41. The finely sized composted material 38 is sent to the dryer 134 as a separate batch of material from the medium sized composted material 39 such that the two different sized composted materials are not mixed.

During the drying operation 41, water and moisture are removed from the fine composted material 38 and the medium composted material 39 resulting in dried compost material that contains a desired moisture level. After the drying operation, the fine composted material 38 and the medium composted material 39 are separately sent through a trommel screening operation 42. The trommel screening operation 42 separates the fine composted material 38 and the medium composted material 39 into two different sizes. The small dried compost material or fertilizer 43 has an average size of 3 to 4 millimeters in diameter. The medium dried compost material or potting soil 44 has an average size of 4 to 12 millimeters in diameter. The fertilizer 43 is transferred to a building for storage 46. The potting soil 44 is transferred to a building where the potting soil 44 is packaged into bags in a bagging operation 45. The bags of potting soil 44 are then stored 48.

C. Weigh Scale

Figure 2:
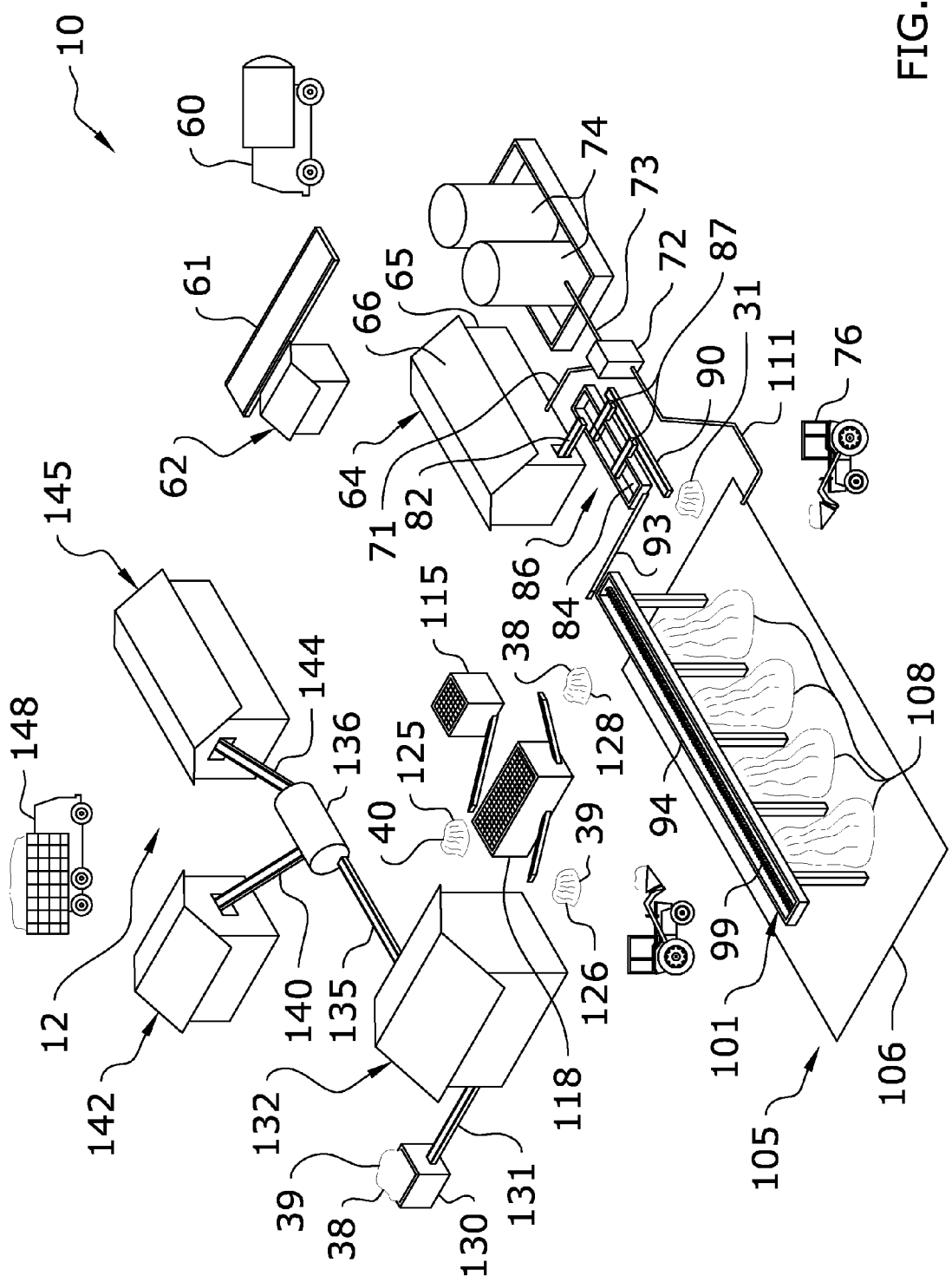
FIG. 2 is an overall upper perspective view of the garbage to fertilizer conversion system of the present invention.

Referring to FIG. 2, household garbage or waste 20 is brought to the processing facility 12 by garbage trucks 60 and is weighed on a weight scale 61. The full garbage truck 60 is first weighed on weight scale 61. After the garbage truck 60 has unloaded its contents into processing building 64, the empty garbage truck 60 is weighted again. The resulting net weight of the incoming garbage 20 is determined my subtracting the weight of the full garbage truck 60 from the weight of the empty garbage truck 60. In one embodiment, the weight of the garbage 20 is displayed on video display in a weighing building 62.

D. Processing Building

Figure 3:
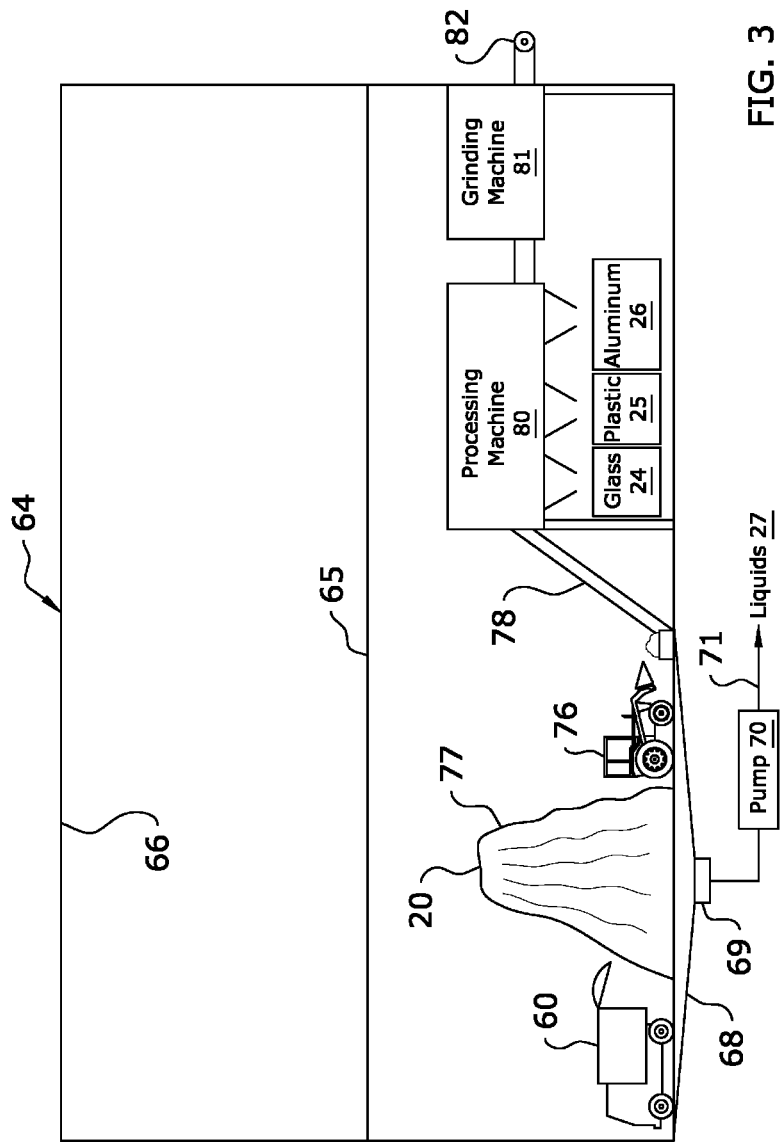
FIG. 3 is a side cross-sectional view illustrating the contents of a processing building.

With reference to FIGS. 2 and 3, a receiving and processing building 64 is shown. Processing building 64 includes reinforced walls 65, a roof 66 and a sloped cement floor 68. In one embodiment, building 64 has dimensions of 500 feet in length by 120 feet in width and a height of 34 feet. The reinforced walls can be from 2 to 7 feet in height. In one embodiment, the slope of floor 68 is 1 percent. Sloped floor 68 is slanted toward a central collection basin 69. Any waste liquids 27 contained and released from the household garbage 20 will flow into central collection basin 69. Waste liquids 27 are pumped by a pump 70 from collection basin 69 through a pipe 71 and through a filter 72 to remove any remaining solids. After the filter 72, the waste liquids 27 are pumped through another pipe 73 into one or more storage tanks 74. The waste liquids 27 in storage tanks 74 can be diluted and used as a liquid fertilizer.

Garbage trucks 60 enter the processing building 64 and dump the household garbage 20 onto floor 68. A front end loader loads the garbage 20 from a storage pile 77 onto a conveyer belt 78. The conveyer belt 78 carries the garbage into a separating or processing machine 80. The separating machine 80 is an automated machine that removes glass 24, plastic 25 and aluminum 26 from the remaining material with is primarily organic waste and paper. The glass 24, plastic 25 and aluminum 26 fall via gravity into bins and can be recycled. The remaining material is transferred to a grinding machine 81 where the material is subjected to a grinding operation in order to reduce the size of the garbage material. The ground up remaining material exits processing building 64 on a conveyer belt 82.

E. Magnetic Separators and Compost Area

Figure 4:
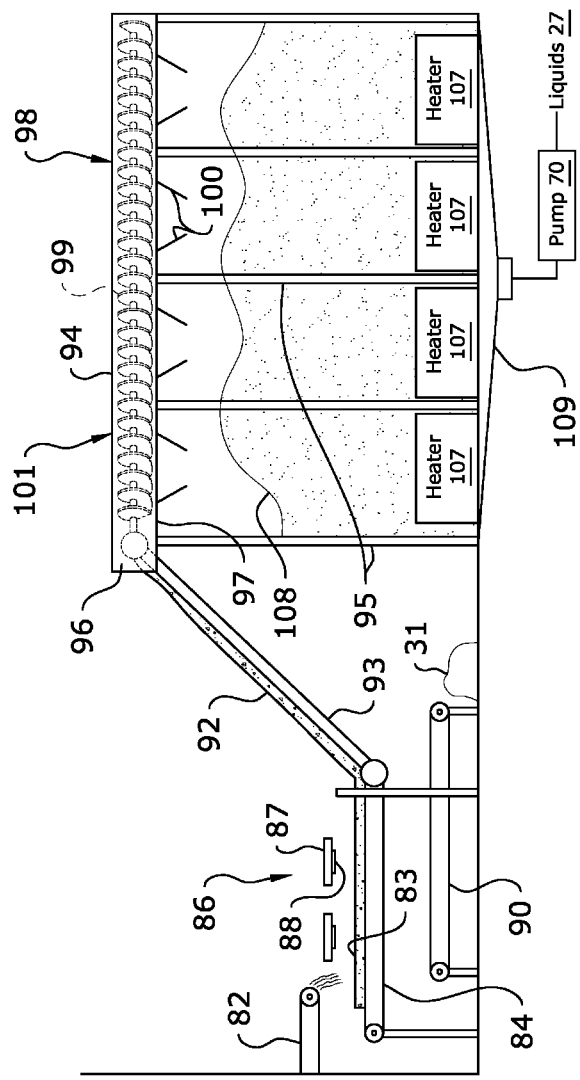
FIG. 4 is a side view of the magnetic separator and composting area.

Turning to FIGS. 2 and 4, magnetic separators 86 and a compost area 105 are shown. Waste material 83 exiting processing building 64 on conveyer belt 82 is dropped onto another moving conveyer belt 84. Magnetic separators 86 are mounted above moving conveyer belt 84. Magnetic separators 86 comprise a pair of rotating belts 87 that have electromagnets 88 mounted thereon. Electromagnets 88 can be selectively energized and de-energized in order to start and stop a magnetic field. Electromagnets 88 are energized while over conveyer belt 84 in order to pickup any ferromagnetic materials such as iron or steel. After the rotating belts 87 have moved away from conveyer belt 84 and over conveyer belt 90, the electromagnets 88 are de-energized causing any iron or steel picked up by electromagnets 88 to drop onto conveyer belt 90. The iron and steel materials 31 are deposited into a pile at the end of conveyer belt 90.

The remaining waste material 92 is carried by a sloping portion 93 of conveyer belt 84 upwardly and into a rectangular shaped elevated auger assembly 101 that is suspended on legs 95. Auger assembly 101 has a trough 94 that includes side walls 96 and a bottom wall 97. Walls 96 and 97 define a channel 98. A rotating auger 99 is mounted in channel 98 and is coupled to an electric motor that can rotate the auger. Several doors 100 are mounted in bottom wall 97 along the length of the trough 94. Doors 100 can be spaced every 25 feet along trough 94. Doors 100 can be selectively opened and closed. Rotating auger 99 moves the waste material 92 along the length of the trough 94.

Compost area 105 is located under auger assembly 101. Compost area 105 has a cement floor 106 and heaters 107 mounted on floor 106. In one embodiment, heaters 107 are electric heaters. As the remaining waste material 92 is moved along trough 94 by rotating auger 99, doors 100 are opened such that the waste material falls through doors 100 to form compost piles 108. After the piles 108 are formed, the waste material is left to compost for a period of time. In one embodiment, the composting time is between 45 and 55 days. During composting, the temperature within the compost pile is maintained between 170 to 215 degrees Fahrenheit by heaters 107. Forming the compost piles 108 evenly assists in maintaining the temperature during the composting process.

In one embodiment, the slope of floor 106 is 1 percent. Sloped floor 106 is slanted toward a central collection basin 109. Any waste liquids 33 released from compost piles 108 will flow into central collection basin 109. Waste liquids 33 are pumped by a pump 70 from collection basin 109 through a pipe 111 and through a filter 72 to remove any remaining solids. After the filter 72, the waste liquids 33 are pumped through another pipe 73 into one or more storage tanks 74. The waste liquids 27 and 33 in storage tanks 74 can be diluted and used as a liquid fertilizer.

F. Three Stage Screen

Figure 5:
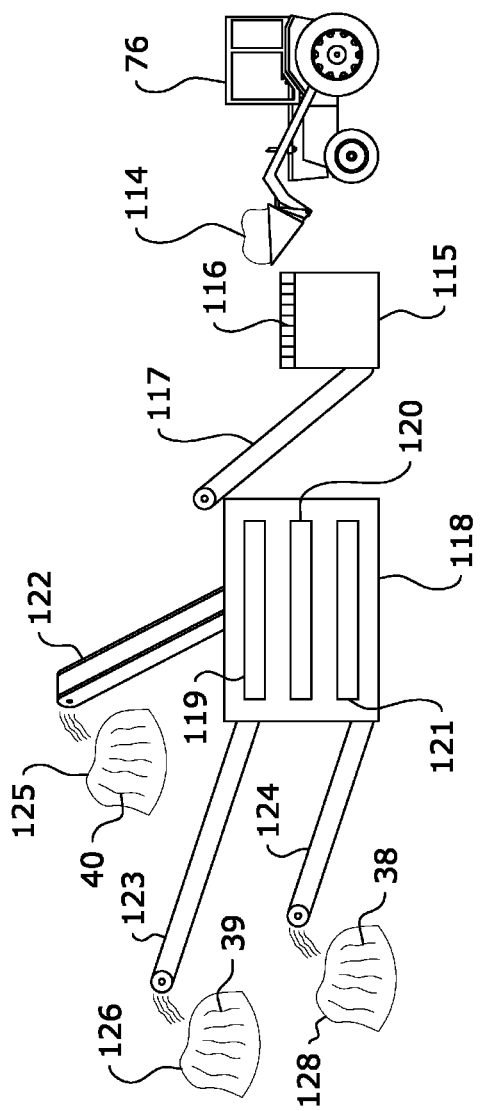
FIG. 5 is a side view of the three stage screen.

Referring to FIGS. 2 and 5, after the composting process has been completed, the composted material 114 is moved using a front end loader 76 from compost piles 108 and is dumped into a bin 115. Bin 115 is covered by a grill 116. Grill 116 assists with breaking up any pieces of compost material 114 that has clumped together. A conveyor belt 117 is positioned at the bottom of bin 115 and transports the composted material from bin 115 to a three stage vibrating screen 118. The three stage screen 118 sorts the composted material 114 by size into three different sized fractions or components. The three stage vibrating screen 118 includes a first screen 119, a second screen 120 and a third screen 121.

The first screen 119 removes oversize composted material 40 from the top of screen 119. The oversize composted material 40 is transferred by conveyor belt 122 from the first screen 199 to a pile 125. The oversize composted material 40 from pile 125 is returned to the compost pile 108 by the front end loader 76 where the oversize composted material 40 is further broken down. The second screen 120 removes a medium sized fraction composted material 39 from the top of screen 120. The medium size composted material 39 is transferred by conveyer belt 123 from the second screen 120 to a pile 126. The third screen 121 removes a finely sized fraction composted material 38 from the top of screen 121. The finely sized composted material 38 is transferred by conveyer belt 124 from the third screen 121 to a pile 128.

G. Drying Building and Trammel Screen

Figure 6:
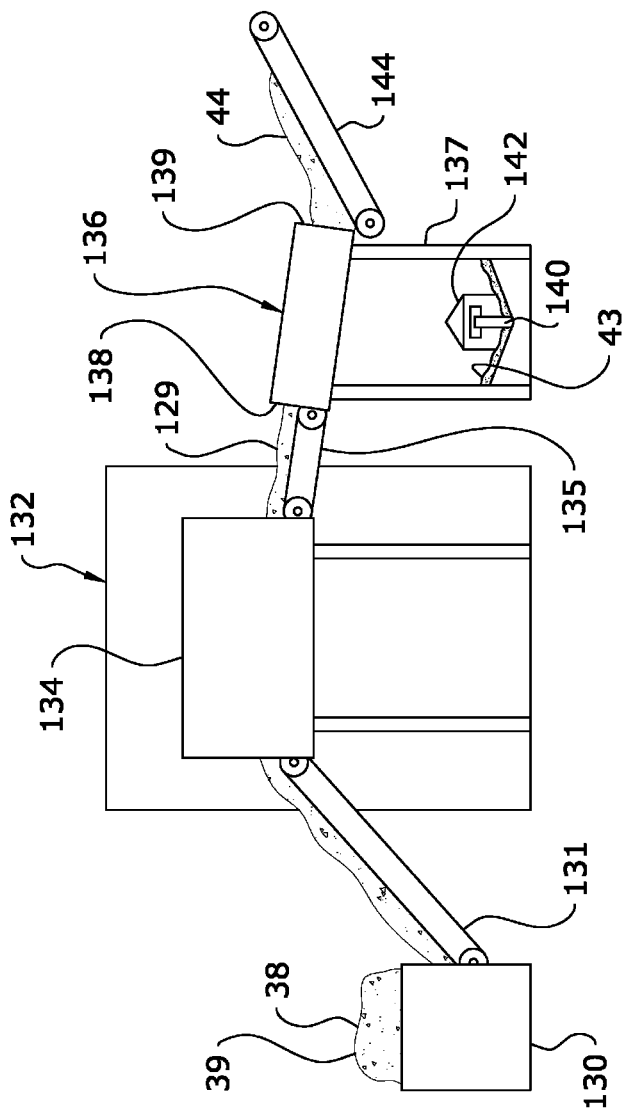
FIG. 6 is a side view of the drying building and tromell screen.

With reference to FIGS. 2 and 6, a drying building 132 and a trommel screen 136 are shown. The fine and medium sized composted materials 38, 39 are sent to a dryer 134 to undergo a drying operation 41. Front end loader 76 picks up fine and medium sized composted materials 38, 39 from piles 126 and 128 and deposits these material into bin 130. A conveyor belt 131 is positioned at the bottom of bin 130 and transports the composted material 38, 39 from bin 130 to the dryer 134 within drying building 132. Dryer 134 dries the composted materials 38, 39 to a desired moisture level through the application of heat and moving air. In one embodiment, dryer 134 operates between 225 to 300 degrees Fahrenheit and can process 200 to 300 tons per hour. In one embodiment, the dryer 134 melts any remaining small pieces of plastic during the drying operation 41. In one embodiment, dryer 134 is a Boeing model 300 dryer 134. The dried composted materials 129 are transported by a conveyer belt 135 from the dryer 134 into a rotating trommel screen 136.

The trommel screen 136 rests on support members 137 and slopes downwardly from the entrance end 138 to the exit end 139. Conveyer belt 135 deposits material into entrance end 138. The trommel screen 136 separates the dried fine composted material 38 and the medium composted material 39 into two different sized fractions or component sizes. Small dried composted material 43 falls through the trommel screen 136 and is deposited onto conveyer belt 140. The small dried composted material 43 has an average size of 3 to 4 millimeters in diameter. The small dried compost material 43 is transferred via conveyer belt 140 to fertilizer storage building 142.

The medium dried composted material 44 exits the exit end 139 and is deposited onto conveyer belt 144. The medium dried compost material 44 has an average size of 4 to 12 millimeters in diameter. The medium dried compost material 44 is transferred to a bagging building 145 where the medium dried compost material 44 is packaged into bags in the bagging operation.

H. Fertilizer Building

Figure 7:
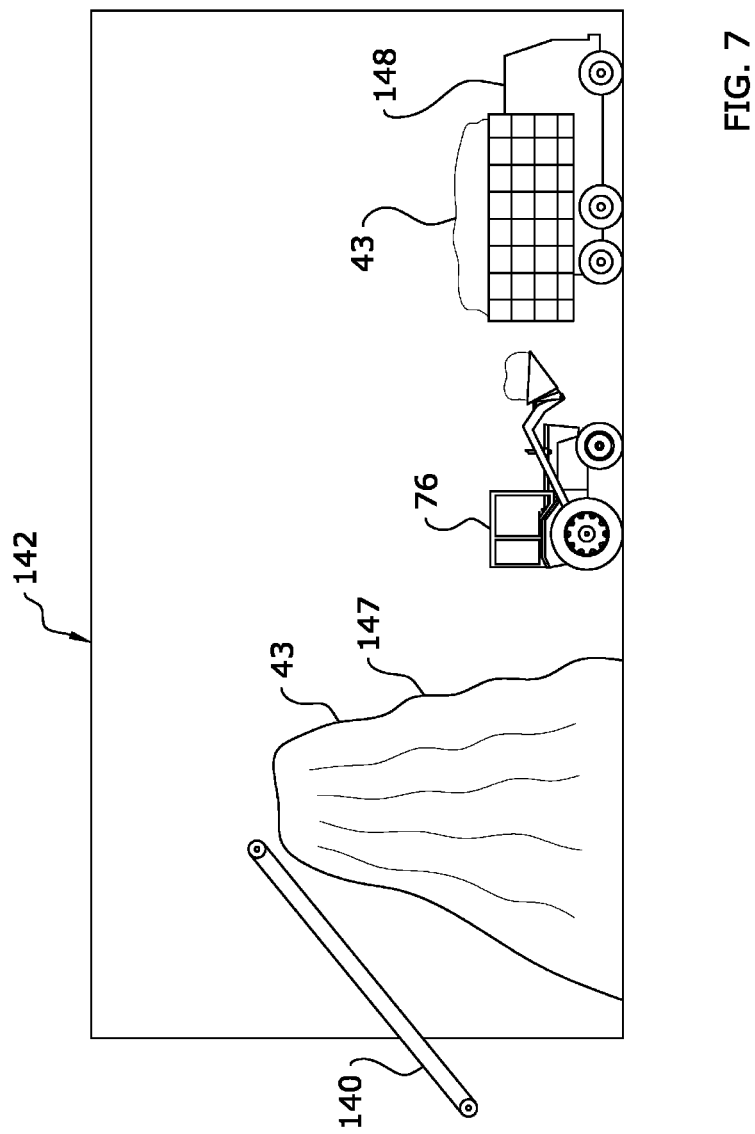
FIG. 7 is a side cross-sectional view illustrating the contents of a fertilizer building.

FIG. 7 illustrates the interior of a fertilizer building 142. The small dried compost material 43 is transferred via conveyer belt 140 into fertilizer storage building 142 forming a pile 147. In one embodiment, fertilizer storage building 142 can store 5,000 to 10,000 tons of dried compost material 43. The small dried compost material 43 can be used as a granular fertilizer and can be spread onto farm fields using a fertilizer spreader. The small dried compost material 43 is loaded by a front end loader 76 onto a truck 148 for delivery.

I. Packaging Building

Figure 8:
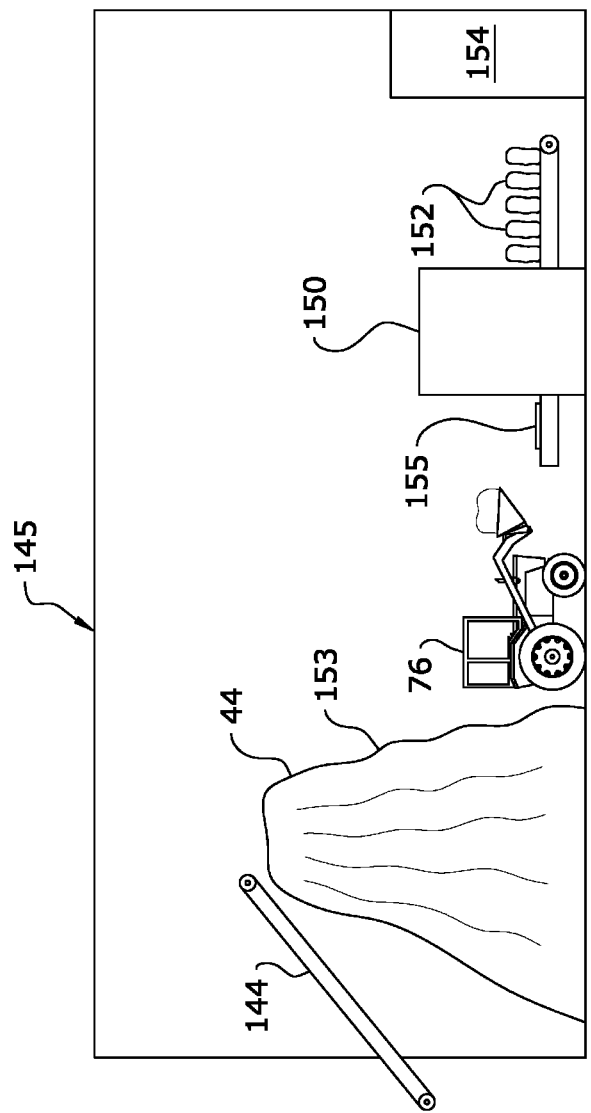
FIG. 8 is a side cross-sectional view illustrating the contents of a packaging building.

FIG. 8 illustrates the interior of a packaging building 145. The medium dried compost material 44 is transferred to packaging building 145 where the medium dried compost material 44 is packaged into bags 152 in the bagging operation 45. The medium dried compost material 44 is transferred via conveyer belt 144 into packaging building 145 forming a pile 153. Packaging building 145 contains a bagging machine 150. Bagging machine 150 can fill and seal bags 152 with the medium dried compost material 44. In one embodiment, bagging machine 150 can fill and seal bags 152 that hold 2, 5 or 10 pounds of medium dried compost material 44. The medium dried compost material 44 can be used as potting soil in containers and in gardens. The medium dried compost material 44 is loaded by a front end loader 76 into a receiving tray 155 that receives material to be packaged by bagging machine 150. After the bags 152 are filled and sealed, they are placed in a storage area 154 within packaging building 145.

J. Operation of Preferred Embodiment

In use, garbage 20 is weighed on a scale 61 to determine the weight of the garbage 20. The garbage 20 is placed into a processing machine 80 by a front end loader 76 to segregate out non-compostable materials from the organic materials. The processing machine 80 removes glass 24, plastic 25 and aluminum 26 and deposits these via gravity into bins 130. These materials can be recycled. The garbage is then ground or shredded by a grinding machine 81 to a smaller size. The ground or shredded garbage is transferred by conveyer belt 82 to a magnetic separation conveyer belt 83 to undergo a magnetic separation process 30 using magnets 88 to remove ferromagnetic materials such as iron and steel 31.

The remaining garbage materials are primarily organic materials and are transported by a conveyer belt 93 and auger 99 and are deposited into compost piles 108. During a composting process, a variety of micro-organisms breakdown the organic materials in compost piles 108 into compost. The temperature of the compost piles 108 are maintained by heaters 107 between 170 to 215 degrees Fahrenheit. After composting, the composted material is sorted for size by screening through a three stage screen 118. The three stage screen 118 has a first screen 119, a second screen 120 and a third screen 121. A front end loader 76 moves the composted material 114 from the compost piles 108 into three stage screen 118. The first screen 119 removes oversize composted material 40. The oversize composted material 40 is returned to the compost piles 108 by the front end loader 76, where the oversize composted material 40 is further broken down. The second screen 120 removes medium sized composted material 39. The medium sized composted material 39 is moved to a dryer 134 by the front end loader 76 to undergo drying. The third screen 121 removes finely sized composted material 38. The finely sized composted material 38 is moved to a dryer 134 by the front end loader 76 to undergo drying.

The medium sized composted material 39 and finely sized composted material 38 are placed in a bin 130 and transported to the dryer 134 by a conveyer belt 131. During drying, water and moisture are removed from the fine composted material 38 and the medium composted material 39 resulting in dried compost material that contains a desired moisture level. The dried compost materials exit the dryer on a conveyer belt 135 and are transferred into trommel screen 136. The trommel screen 136 separates the fine composted material 38 and the medium composted material 39 into small and medium sizes. The small dried compost material 43 has an average size of 3 to 4 millimeters in diameter and can be used as fertilizer. The medium dried compost material 44 has an average size of 4 to 12 millimeters in diameter and can be used as potting soil. The small dried compost material 43 is transferred to a fertilizer building 142 via a conveyer belt 140 for storage. The medium dried compost material 44 is transferred to a packing building 145 via a conveyer belt 144 where the medium dried compost material 44 is packaged into bags 152 by a bagging machine 150. The bags 152 are then stored in a storage area 154.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A process for converting garbage to fertilizer, the process comprising:
    receiving untreated garbage material at a processing building having a sloped floor slanted toward a central collection basin, wherein any waste liquids contained and released from said garbage material flow into said central collection basin and are subsequently filtered and pumped to a storage tank;
    separating said untreated garbage into compostable material and non-compostable material;
    separating ferromagnetic materials from said compostable material;
    transferring said compostable material via an auger to form piles of said compostable material;
    composting said piles of compostable material to maintain the interior of said piles between 170 to 215 degrees Fahrenheit to form a composted material;
    screening said composted material into an oversize fraction, a medium sized fraction and a fine fraction;
    returning said oversize fraction to a compost pile;
    transferring said medium size fraction and said fine fraction to a dryer;
    drying said medium size fraction and said fine fraction in said dryer to form a dried composted material; and
    screening said dried composted material into a small sized fraction having an average size of 3 to 4 millimeters in diameter and a medium sized fraction having an average size of 4 to 12 millimeters in diameter.

2. The process for converting garbage to fertilizer of claim 1, comprising weighing said untreated garbage material on a weight scale.

3. The process for converting garbage to fertilizer of claim 1, comprising:
    collecting a liquid runoff from the untreated garbage and the compostable material;
    filtering the liquid; and
    pumping the liquid into a storage tank.

4. The process for converting garbage to fertilizer of claim 1, wherein said pile of composted material is allowed to compost between 45 and 55 days.

5. The process for converting garbage to fertilizer of claim 1, comprising packaging said medium sized fraction dried composted material into at least one bag, wherein said medium sized fraction dried composted material is useable as a potting soil.

6. The process for converting garbage to fertilizer of claim 1, wherein said small sized fraction dried composted material is useable as a fertilizer.

7. The process of converting garbage to fertilizer of claim 1, further comprising the step of providing a magnetic separator for receiving said compostable material from a processing machine.

8. The process of converting garbage to fertilizer of claim 7, wherein said auger receives said compostable material from said magnetic separator.

9. The process of converting garbage to fertilizer of claim 1, further comprising the step of providing at least one heater located under said piles of composted material.

10. The process of converting garbage to fertilizer of claim 1, further comprising the step of receiving said dried composted material by a trommel screen.

11. The process of converting garbage to fertilizer of claim 1, further comprising the steps of transferring said small sized fraction composted material to a fertilizer building for storage and transferring said medium sized fraction composted material to a packaging building for packaging.

12. A process for converting garbage to fertilizer, the process comprising:
    receiving untreated garbage material at a processing building having a sloped floor slanted toward a central collection basin, wherein any waste liquids contained and released from said garbage material flow into said central collection basin and are subsequently filtered and pumped to a storage tank;
    separating said untreated garbage into compostable material and non-compostable material with a processing machine;

separating ferromagnetic materials from said compostable material with a magnetic separator;

transferring said compostable material via an auger assembly to form piles of said compostable material;

composting said piles of compostable material to maintain the interior of said piles between 170 to 215 degrees Fahrenheit to form a composted material;

screening said composted material into an oversize fraction, a medium size fraction and a fine fraction;

returning said oversize fraction to a compost pile;

transferring said medium size fraction and said fine fraction to a dryer;

drying said medium size fraction and said fine fraction in said dryer to form a dried composted material; and screening said dried composted material with a trommel screen into a small sized fraction having an average size of 3 to 4 millimeters in diameter and a medium sized fraction having an average size of 4 to 12 millimeters in diameter.

13. The process of converting garbage to fertilizer of claim 12, wherein said magnetic separator includes at least one rotating belt that has at least one magnet mounted thereon and a first conveyer belt located below said rotating belt.

14. The process of converting garbage to fertilizer of claim 13, wherein a second conveyer belt is mounted between said first conveyer belt and said auger assembly.

15. The process of converting garbage to fertilizer of claim 14, wherein an entrance to said dryer includes a third conveyer belt, wherein said third conveyer belt transports composted material into said dryer.

16. The process of converting garbage to fertilizer of claim 15, further comprising the step of providing a fourth conveyer belt mounted between an exit of said dryer and an entrance of said trommel screen, said fourth conveyer belt transporting said dried composted material from said dryer into said trommel screen.

17. The process of converting garbage to fertilizer of claim 16, further comprising the step of transporting said medium sized fraction composted material to a packaging building with a fifth conveyer belt, wherein said fifth conveyer belt is mounted between an exit of said trommel screen and said packaging building.

18. The process of converting garbage to fertilizer of claim 17, further comprising the step of transporting said small sized fraction composted material to a fertilizer building with a sixth conveyer belt, wherein said sixth conveyer belt is mounted between a bottom of said trommel screen and said fertilizer building.

19. The process of converting garbage to fertilizer of claim 12, wherein said auger assembly includes a trough having an auger mounted therein and a plurality of doors mounted in a bottom of said trough.

20. A process for converting garbage to fertilizer, the process comprising:

receiving untreated garbage material at a processing building having a sloped floor slanted toward a central collection basin, wherein any waste liquids contained and released from said garbage material flow into said central collection basin and are subsequently filtered and pumped to a storage tank;

separating said untreated garbage into compostable material and non-compostable material with a processing machine;

separating ferromagnetic materials from said compostable material with a magnetic separator, wherein said magnetic separator includes at least one rotating belt that has at least one magnet mounted thereon and a first conveyer belt located below said rotating belt;

transferring said compostable material via an auger assembly to form piles of said compostable material, wherein a second conveyer belt is mounted between said first conveyer belt and said auger assembly;

composting said piles of compostable material to maintain the interior of said piles between 170 to 215 degrees Fahrenheit to form a composted material;

screening said composted material into an oversize fraction, a medium size fraction and a fine fraction;

returning said oversize fraction to a compost pile;

transferring said medium size fraction and said fine fraction to a dryer;

drying said medium size fraction and said fine fraction in said dryer to form a dried composted material, wherein an entrance to said dryer includes a third conveyer belt, wherein said third conveyer belt transports composted material into said dryer;

screening said dried composted material with a trommel screen into a small sized fraction having an average size of 3 to 4 millimeters in diameter and a medium sized fraction having an average size of 4 to 12 millimeters in diameter, wherein a fourth conveyer belt is mounted between an exit of said dryer and an entrance of said trommel screen;

transporting said medium sized fraction composted material to a packaging building with a fifth conveyer belt, wherein said fifth conveyer belt is mounted between an exit of said trommel screen and said packaging building; and transporting said small sized fraction composted material to a fertilizer building with a sixth conveyer belt, wherein said sixth conveyer belt is mounted between a bottom of said trommel screen and said fertilizer building.

* * * * *